United States Patent [19]

Bryce, Jr.

[11] Patent Number: 4,541,761
[45] Date of Patent: Sep. 17, 1985

[54] EASILY REMOVED BLIND RIVET

[75] Inventor: William D. Bryce, Jr., Seymour, Conn.

[73] Assignee: USM Corporation, Farmington, Conn.

[21] Appl. No.: 535,436

[22] Filed: Sep. 26, 1983

[51] Int. Cl.$^4$ .............................................. F16B 13/04
[52] U.S. Cl. ...................................... 411/34; 411/42; 411/501
[58] Field of Search ..................... 411/34–38, 411/39–43, 55, 57–62, 70, 476, 486, 500–507

[56] References Cited

U.S. PATENT DOCUMENTS

| 414,682 | 11/1889 | Cummings | 411/501 |
| 975,235 | 11/1910 | Hansen | 411/476 |
| 3,515,028 | 6/1970 | Patton | 411/70 |
| 4,436,467 | 3/1984 | Larsson et al. | 411/34 |

FOREIGN PATENT DOCUMENTS 2077383 12/1981 United Kingdom ................ 411/500

Primary Examiner—Gary L. Smith
Assistant Examiner—Neill Wilson
Attorney, Agent, or Firm—Alan N. McCartney

[57] ABSTRACT

An easily removable blind rivet of the type having an open rivet body with a flange on one end and a mandrel positioned within the opening in the rivet body, the mandrel having an enlarged head at one end adapted to upset the rivet body when the mandrel is pulled. The rivet flange has a portion formed out of the surface of the flange which is adapted to be gripped so that the flange can be removed from the rivet body enabling the rivet body to be passed through the opening in a workpiece.

4 Claims, 5 Drawing Figures

EASILY REMOVED BLIND RIVET

BACKGROUND OF THE INVENTION

1. Field of the Invention

This invention relates to blind rivets and particularly blind rivets that can be easily removed from the workpiece or workpieces after being installed.

2. Statement as to Prior Art

There are several different types of blind rivets on the market. These rivets generally comprise a hollow rivet body having a flanged head. A mandrel is passed through the body with a head on a mandrel positioned adjacent the open end of the rivet body opposite the flanged head. Another type of blind rivet has a rivet body which is closed at the end opposite the flanged head, and the mandrel head is enveloped in the closed end of the rivet body. These are called closed end rivets. With either type, the rivet body can then be inserted into the opening in a workpiece wherein the flange of the rivet lies flat against the surface of the workpiece. By placing the nosepiece of a rivet setting tool adjacent the rivet flange, and by pulling on the mandrel, the head of the mandrel upsets the rivet body on the opposite side of the workpiece to deform the rivet and secure it within the workpiece. This process is generally know in the art as "setting" the rivet. A continued pulling of the mandrel will break off the mandrel head with the removed mandrel stem passing through the rivet. In this fashion, the rivet is secured in the opening of the workpiece between the rivet flange on one side of the workpiece and the deformed rivet body on the opposite side of the workpiece from the rivet flange.

Examples of rivets of these types and tools for setting the rivets are illustrated in U.S. Pat. Nos. 3,254,522; 3,302,444, 3,324,700, and 2,779,955.

SUMMARY OF THE INVENTION

In the aforementioned blind rivet devices and their application to workpieces, it is the major intention that the rivet and workpieces become permanently attached.

There are, however, some applications for such blind rivets where is desirable to merely provide a temporary attachment between the workpieces. Therefore, it would be desirable to have an easily removable blind rivet. For example, as illustrated and discussed herein, it may be desirable to secure two metal workpieces together in a proper predetermined relation so that the workpieces could be permanently welded together. Thereafter it may be desirable to remove the temporary securing means.

It is therefore an object of this invention to provide an easily removable blind rivet.

It is a further object of this invention to provide in a blind rivet an easily removable rivet flange that can be gripped by a removing tool to remove the flange so that rivet can be passed on through the opening in the workpiece.

It is an additional object of the invention to raise a portion of a rivet flange out of the surface of the flange to form a tab that can be gripped by a tool so the flange of the rivet can be torn loose from the rivet body to enable the rivet body to be passed through the opening in a workpiece.

These and other objects of this invention will become more apparent from the accompanying description along with the drawings.

DESCRIPTION OF THE PREFERRED EMBODIMENT

Figure 1:
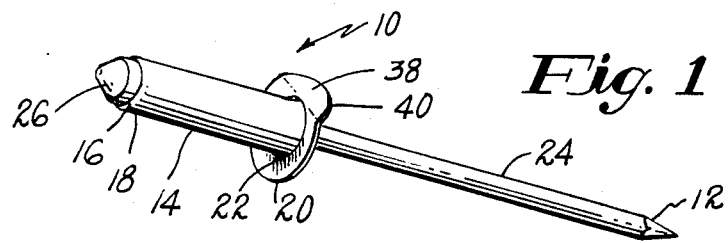
FIG. 1 is an illustration of the blind rivet assembled on a mandrel.
Figure 2:
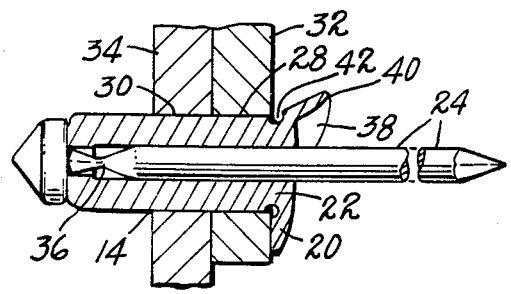
FIG. 2 is an illustration of the assembled blind rivet and mandrel positioned through the openings in workpieces.

Attention is now directed to FIG. 1 which illustrates the assembled blind rivet 10 and mandrel 12. The rivet contains a cylindrical open body portion 14 having an opening 16 on one end 18 and a flange 20 on the opposite end 22.

The mandrel 12 contains an elongated stem 24 terminating in a head portion 26. The elongated stem 24 is approximately the same diameter as the diameter of the opening 16 in rivet body portion 14. The stem 24 is adapted to passed through the opening 16 until the mandrel head portion 26 abuts the end 18 of the rivet body 14, as illustrated.

In the above described assembled condition the blind rivet 10 is adapted, for example, to be inserted into openings 28 and 30 of workpieces 32 and 34. The openings 28 and 30 are the approximate diameter of the diameter of the body portion 14 of the rivet 10.

Figure 3:
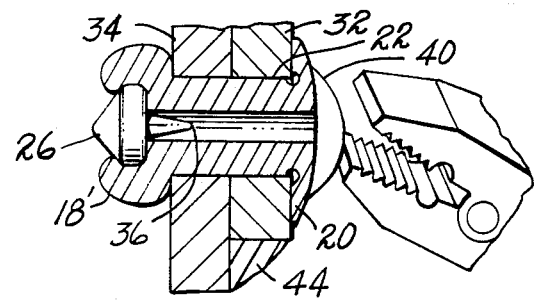
FIG. 3 is an illustration of the blind rivet in a "set" condition in the workpieces.

In the operation of setting the conventional rivet thus far described, the nosepiece (not shown) of a rivet setting tool of the type described in U.S. Pat. No. 3,254,522 is placed adjacent the flange 20 of the rivet. The mandrel stem 24 is then pulled so that the mandrel head portion 26 is forced against the end 18 of rivet body 14 to upset the rivet body 14 in the conventional manner, as illustrated in FIG. 3. Normally there is reduced neck area 36 between the mandrel stem 24 and head portion 26. As the stem 24 is pulled, the mandrel breaks at the neck area 36 so that the stem 24 is removed and the head portion 26 is retained in the deformed end 18 of the rivet body 14.

The improvement of this invention in the above described conventional rivet is the configuration of the flange 20 and its connection to the end 22 of the rivet body portion 14. As illustrated in the drawing, the flange 20 is formed with a portion 38 formed out of the surface of the flange to present a raised tab 40. Further, the area 42 of the connection between the flange 20 and the end 22 of body portion 14 is releaved in an area of the circumference of that connection.

Figure 4:
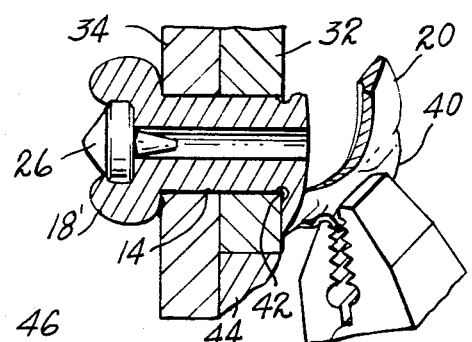
FIG. 4 is an illustration of the blind rivet in the workpieces with the flange of the rivet being removed.

The rivet assembly of this invention is formed in the setting operation, in the conventional manner (the nose of the setting tool would have a relieved area to accommodate the tab 40 so the tab would not be deformed in the setting operation - such a nosepiece on a setting tool is illustrated in U.S. Pat. No. 3,254,522). Thereafter, when it is desired to remove the rivet from the workpieces, the tab 40 can be gripped by the jaws 44 of a pair of pliers 46 and torn from the rivet body. The relieved area 42 between the flange 20 and rivet body 14, provides a localized point at which the separation of the flange 20 and body 14 occurs so that the flange 20 is removed from the body 14 with a portion of the body 14 extending beyond the surface of the workpiece. Thereafter, the exposed end of the rivet body 14 can be struck to free the rivet body 14 from the openings 28, 30 to remove the rivet body from the workpiece. This is illustrated in FIGS. 4 and 5.

Figure 5:
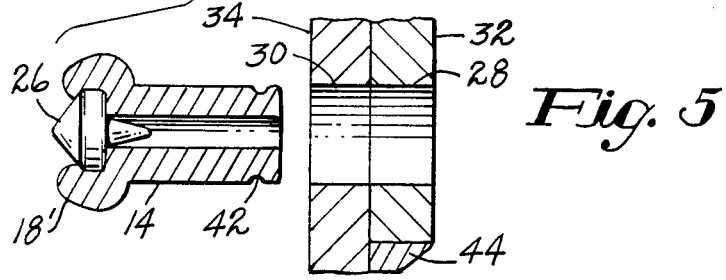
FIG. 5 is an illustration of blind rivet with the flange removed and the rivet body passed through the openings in the workpieces.

After the flange 20 has been completely removed from the rivet body 14, the rivet can be pushed through openings 28 and 30 and removed from the workpieces as illustrated at 46 in FIG. 5.

One application of an easily removable blind rivet of this invention is also illustrated in the drawing. Should it be desirable to temporarily secure two workpieces in a predetermined relationship for permanently securing them together, the novel easily removable blind rivet of this invention would be very suitable. Consider that the workpiece 32, 34 are metal members and the rivet 10 has been set in place. The workpieces 32, 34 can now be permanently secured together by a weld 44. Thereafter, the rivet 10 can be removed in the manner described so as not to be a hindrance to the assembled workpieces or the surfaces on the workpieces against which additional operations may have to be performed. Additionally, it may be desirable to utilize the free openings 28, 30 for additionally bolting or otherwise fastening the assembled workpieces to other members.

Another application for the above described invention is an environment wherein it is desirable to periodically replace a worn working member secured to the workpiece. An illustration of this application of the rivet is to secure a transformer to a printed circuit board. Periodically the transformer becomes inefficient or inoperative. Once the transformer is secured to the printed circuit board or other support wherein it is being used, by the instant rivet, and the transformer becomes non-functional, it can be easily removed from the board by removing the flange 20 from the rivet 10. Thereafter, a replacement transformer can be attached to the board by another set of rivets of the type of the invention described herein.

An additional application of the blind rivet of this invention is to fixture workpieces together that have been glued and hold the workpieces in place while the adhesive cures.

I claim:

1. A blind rivet assembly adapted to be placed through the opening in a workpiece comprising:
    a. a rivet having a hollow body portion and an interconnected flange normal to the body portion;
    b. a mandrel having a head and an elongated stem projecting from said flange;
    c. said mandrel stem being adapted, upon pulling said stem, to upset said rivet body portion so that the rivet flange would rest against one surface of a workpiece and the upset rivet body portion against the opposite surface of a workpiece with said rivet body and flange remaining intact;
    d. said interconnection of said flange and said body portion has a reduced area to provide a localized area of weakness between said flange and said body portion, said reduced area extending into the under surface of said flange, said flange having a tab means associated therewith, said tab means being adapted to be pulled by a gripping tool to remove said flange from said body portion along said localized area of weakness with a portion of said body portion protruding beyond the surface of the workpiece.

2. The blind rivet assembly of claim 1, wherein said tab means is formed by a portion of said flange raised out of the surface of said flange, so that said tab means can be pulled by a gripping tool to remove said flange from said body portion to enable said body portion to be passed through the opening in the workpiece to remove the rivet from the workpiece.

3. A blind rivet assembly adapted to be placed through an opening in a workpiece comprising:
    a. a rivet having a hollow body portion and an interconnected flange normal to said body portion, said body portion having an uninterrupted outer surface merging into a localized area of weakness at said flange that extends into the surface of said flange;
    b. a mandrel having a head and an elongated stem with a continuous uninterrupted outer surface, said mandrel being inserted into said rivet body portion with the mandrel stem extending beyond said flange;
    c. said mandrel stem being adapted to be pulled to upset said rivet body portion so that said flange would rest against one surface of the workpiece and the upset rivet body portion against the opposite surface of the workpiece while the rivet body portion and said flange remain interconnected;
    d. said flange having tab means associated therewith, said tab means being adapted to be pulled by a gripping tool to remove said flange from said body portion along said localized area of weakness.

4. The blind rivet assembly of claim 3 wherein said tab means is formed from a portion of said flange raised out of the surface of said flange.

* * * * *